(12) United States Patent
Miglianico

(10) Patent No.: US 11,341,843 B2
(45) Date of Patent: May 24, 2022

(54) WARNING DEVICE FOR AN URBAN PUBLIC TRANSPORT VEHICLE, IN PARTICULAR A TRAMWAY

(71) Applicant: ALSTOM Transport Technologies, Saint-Ouen (FR)

(72) Inventor: Denis Miglianico, Paris (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 370 days.

(21) Appl. No.: 15/684,412

(22) Filed: Aug. 23, 2017

(65) Prior Publication Data

US 2018/0061225 A1 Mar. 1, 2018

(30) Foreign Application Priority Data

Aug. 26, 2016 (FR) ...................... 16 57953

(51) Int. Cl.
| | | |
|---|---|---|
| *B60Q 1/26* | (2006.01) | |
| *G08G 1/005* | (2006.01) | |
| *B60Q 1/50* | (2006.01) | |
| *B61D 13/00* | (2006.01) | |
| *B61D 29/00* | (2006.01) | |
| *B60Q 5/00* | (2006.01) | |
| *B60Q 1/52* | (2006.01) | |
| *B60Q 1/46* | (2006.01) | |

(52) U.S. Cl.
CPC .............. *G08G 1/005* (2013.01); *B60Q 1/46* (2013.01); *B60Q 1/506* (2013.01); *B60Q 1/525* (2013.01); *B60Q 5/006* (2013.01); *B60Q 5/008* (2013.01); *B61D 13/00* (2013.01); *B61D 29/00* (2013.01); *Y02T 30/00* (2013.01)

(58) Field of Classification Search
CPC ........... G08G 1/005; B60Q 1/46; B60Q 5/006
USPC ........................................................ 340/468
See application file for complete search history.

(56) References Cited

U.S. PATENT DOCUMENTS

| | | | | |
|---|---|---|---|---|
| 3,113,293 | A * | 12/1963 | Breese ..................... | B60Q 1/46 246/473.3 |
| 4,213,115 | A | 7/1980 | Wetzel | |
| 6,127,940 | A * | 10/2000 | Weinberg ............... | G08C 23/04 340/12.22 |
| 8,816,841 | B2 | 8/2014 | Gustavsson et al. | |
| 8,992,056 | B2 | 3/2015 | Lin et al. | |
| 2013/0003042 | A1 * | 1/2013 | Sogard ..................... | G01S 1/70 356/23 |
| 2014/0103932 | A1 * | 4/2014 | Swenson ................ | G01R 31/44 324/414 |
| 2015/0204431 | A1 * | 7/2015 | Cochren ................. | F16H 48/34 475/150 |
| 2016/0328969 | A1 * | 11/2016 | Baller ..................... | G01S 19/14 |

(Continued)

FOREIGN PATENT DOCUMENTS

| | | |
|---|---|---|
| CN | 2892607 Y | 4/2007 |
| EP | 3121062 | 1/2017 |
| FR | 1247979 | 12/1960 |

OTHER PUBLICATIONS

Preliminary Search Report for FR 1657953, dated May 8, 2017.

*Primary Examiner* — Tanmay K Shah
(74) *Attorney, Agent, or Firm* — B. Aaron Schulman, Esq.; Stites & Harbison, PLLC

(57) ABSTRACT

The warning device (12) includes a warning light mechanism (16), that is configured so as to emit a flashing strobe light (20) that flashes at a frequency that is higher than 10 Hz.

1 Claim, 1 Drawing Sheet

(56) References Cited

U.S. PATENT DOCUMENTS

2016/0360762 A1\* 12/2016 Mann ..................... A23B 4/052
2017/0197644 A1\* 7/2017 Williams .............. B61L 23/007

\* cited by examiner

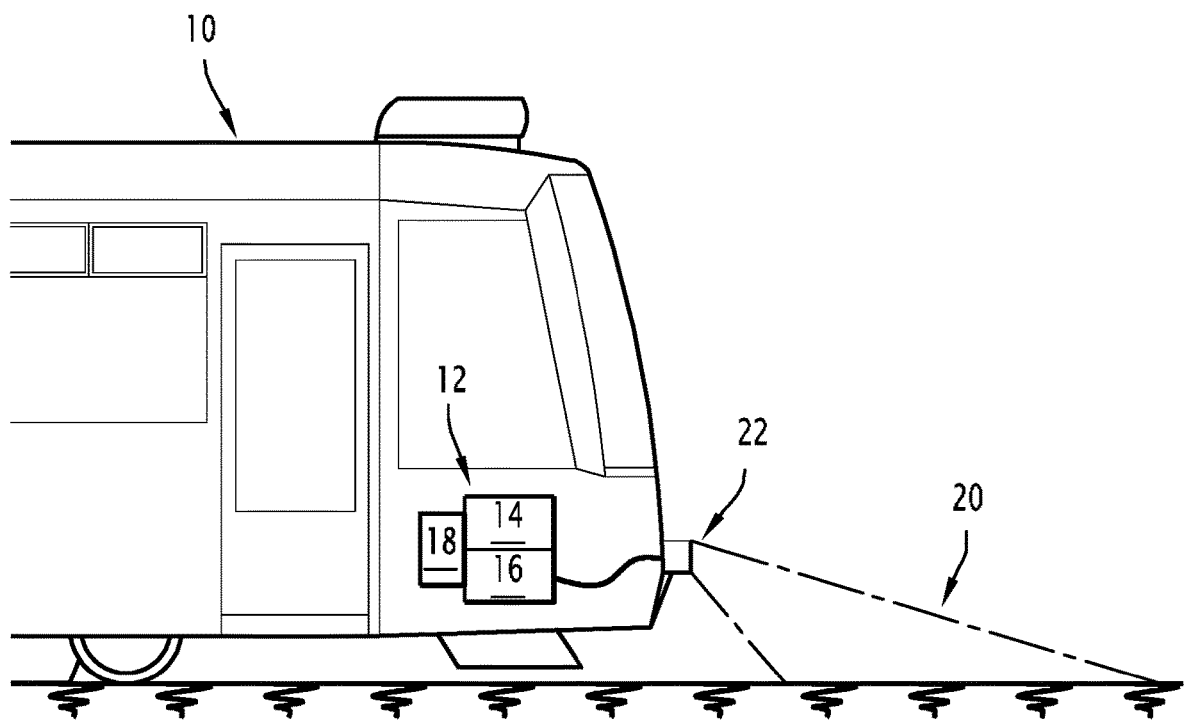

WARNING DEVICE FOR AN URBAN PUBLIC TRANSPORT VEHICLE, IN PARTICULAR A TRAMWAY

FIELD OF THE INVENTION

The present invention relates to a warning device for an urban public transport vehicle, in particular a tramway.

BACKGROUND OF THE INVENTION

Devices already known in the prior art, include audible sound warning devices, designed to warn pedestrians of the arrival of the public transport vehicle. The pedestrians who are so alerted thus then move away from the path of the oncoming vehicle, so as to avoid the vehicle having to slow down in the best case scenario, and in the worst case scenario making an emergency stop (which could endanger the safety of passengers), or even an accident involving the said pedestrians.

However, some pedestrians are not able to hear such an audible sound warning device, in particular persons who are deaf or hearing impaired, or even persons sporting headphones to listen to music which consequently masks the audible sound warning.

In order to ensure that such pedestrians may also be effectively alerted, the state of the art also provides various known light-based warning devices. These devices are designed for the purpose of visually warning of the arrival of the vehicle. Thus, the individuals who are likely to not hear an audible sound warning, are visually warned, with the warning light attracting their attention.

SUMMARY OF THE INVENTION

The object of the invention in particular is to optimise such a warning device, in order to improve the safety of pedestrians who may be deaf, or hard of hearing, or whose hearing is impaired.

To this end, the object of the invention in particular relates to a warning device for an urban public transport vehicle, in particular a tramway, that includes a warning light mechanism, characterised in that the warning light mechanism is configured so as to emit a flashing strobe light that flashes at a frequency higher than 10 Hz.

At the base of the invention, it has been found that such a flashing frequency of a frequency higher than 10 Hz is able to attract the attention of pedestrians in a particularly effective manner.

A warning device according to the invention may further include one or more of the following technical characteristic features, taken into consideration alone or in accordance with any technically feasible combinations.

The warning light mechanism is configured in order to emit light rays in a downward direction when it is mounted on the public transport vehicle.

The light emitted by the warning light mechanism is of an intensity that is greater than 900 lux at 1 metre.

The light emitted by the warning light mechanism flashes with a duty cycle comprised between 45% and 55%.

The light emitted by the warning light mechanism flashes with a duty cycle that is substantially equal to 50%.

The warning light mechanism comprises at least one xenon flash lamp.

The warning light mechanism comprises at least one high power light emitting diode.

The warning device includes an audible sound warning mechanism, and the simultaneous activation means for simultaneously activating the audible sound warning mechanism and the warning light mechanism.

The invention also relates to an urban public transport vehicle, in particular a tramway, characterised in that it includes a warning device as previously defined above.

The invention will be better understood upon reading the description which will follow, provided solely by way of example and with reference made to the appended FIGURE, schematically and partially representing a public transport vehicle fitted with a warning device according to an exemplary embodiment of the invention.

BRIEF DESCRIPTION OF THE DRAWING FIGURE

Partially represented in FIG. 1 is an urban public transport vehicle, in particular a tramway.

DETAILED DESCRIPTION OF EXEMPLARY EMBODIMENTS

The vehicle 10 includes a warning device 12, specifically designed so as to alert pedestrians, near the path of the vehicle 10, of the arrival of the vehicle 10, in order to avoid having to slow down, make an emergency stop, or prevent an accident involving those pedestrians.

The warning device 12 includes in a conventional manner an audible sound warning mechanism 14 to effectively warn pedestrians with a characteristic sound.

However, certain pedestrians, who may be deaf or hearing impaired, or be sporting headphones, are not able to hear this sound.

In order to ensure that such pedestrians are also alerted to the arrival of the vehicle 10, the warning device 12 also includes a warning light mechanism 16, designed to emit a light signal towards the pedestrians.

Advantageously, the warning device 12 includes the simultaneous activation means 18 for simultaneously activating the audible sound warning mechanism 14 and the warning light mechanism 16. It is in effect preferable to provide a warning both by means of an audible signal and a light signal of the arrival of the vehicle, so as to simultaneously alert all pedestrians, whether or not they have normal auditory capacity.

The warning light mechanism 16 includes a strobe, that is capable of emitting a strobe light 20 in the frontwards direction of the vehicle.

Advantageously, the warning light mechanism 16 is configured so as to emit light rays in the downward direction. Indeed, it appears that the projection of the strobe light 20 on the ground optimises its visibility.

According to the invention, the warning light mechanism 16 is configured so as to emit a flashing strobe light that flashes at a frequency that is higher than 10 Hz.

Indeed, it appears that such a frequency that is higher than 10 Hz is optimal in order for the light signal to be effectively perceived by the pedestrians.

Advantageously, the light 20 emitted by the strobe is of an intensity greater than 900 lux at 1 metre. This characteristic feature further improves the visibility of the light signal 20.

Advantageously, on an alternative or supplementary basis with respect to the light intensity defined here above, the light emitted by the strobe light flashes with a duty cycle comprised between 45% and 55%, preferably substantially equal to 50%.

It appears indeed that such a duty cycle is optimal in order for the light signal to be effectively perceived by the pedestrians.

It should be noted that the warning light mechanism 16 includes at least one light emission member 22 for emitting light, arranged in front of the vehicle 10, for example at least one xenon flash lamp and/or at least one high power light emitting diode.

It is to be noted that the invention is not limited to the embodiments previously described above, and may present diverse variant embodiments within the scope of the claims.

The invention claimed is:

1. A warning device for an urban public transport vehicle comprising a warning light mechanism configured so as to emit a flashing strobe light that flashes at a frequency that is higher than 10 Hz, wherein the light emitted by the warning light mechanism is of an intensity that is greater than 900 lux at 1 meter; wherein the warning light mechanism comprises at least one high power light emitting diode.

* * * * *